United States Patent

[11] 3,626,271

[72] Inventor Clyde G. Dewey
  Drexel Hill, Pa.
[21] Appl. No. 888,432
[22] Filed Dec. 29, 1969
[45] Patented Dec. 7, 1971
[73] Assignee General Electric Company

[54] HVDC MATRIX DESIGN
  20 Claims, 3 Drawing Figs.
[52] U.S. Cl. .................................................. 321/11,
  307/252 L, 321/27 R
[51] Int. Cl. ..................................................... H02m 7/00,
  H03r 17/06
[50] Field of Search ............................................ 321/11, 27;
  307/252.54, 252.55; 317/16, 20

[56] References Cited
  UNITED STATES PATENTS

| | | | |
|---|---|---|---|
| 3,386,027 | 5/1968 | Kilgore et al. ................. | 321/11 |
| 3,405,344 | 10/1968 | Boksjo et al ................... | 321/11 |
| 3,423,664 | 1/1969 | Dewey .......................... | 321/11 |
| 3,502,910 | 3/1970 | Johanson-Brown .......... | 307/252.54 |
| 3,521,145 | 7/1970 | Toulemonde et al. ........ | 321/27 |

FOREIGN PATENTS

| | | | |
|---|---|---|---|
| 469,396 | 4/1969 | Switzerland .................. | 321/11 |
| 798,987 | 12/1966 | Canada .......................... | 321/11 |
| 1,160,920 | 8/1969 | Great Britain ................ | 321/11 |

*Primary Examiner*—William H. Beha, Jr.
*Attorneys*—J. Wesley Haubner, Barry A. Stein, Frank L. Neuhauser, Oscar B. Waddell and Joseph B. Forman ABSTRACT: An improved commutation transient suppressing circuit for a thyristor composed matrix. The circuit includes an auxiliary saturable core inductor for absorbing a portion of available stray capacitance energy. Further saturable core inductors are provided to limit discharge current from associated resistance-capacitance voltage-dividing subcircuits. A capacitor is utilized shunting a portion of the resistance of certain adjoining voltage dividing bypass subcircuits to control the order of turn on of the matrix thyristors in response to a voltage surge. A switching matrix having an odd number of serially connected thyristor sections per main saturable core inductor is also disclosed and can be placed in series with other similar matrices to use mechanically paired thyristor sections.

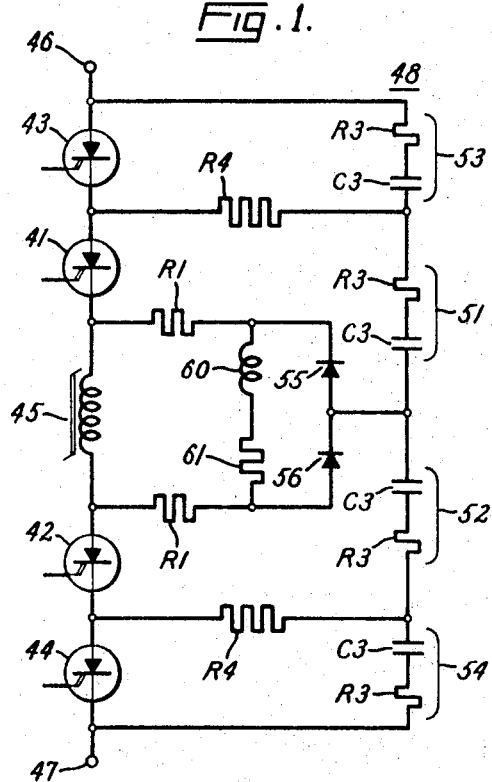
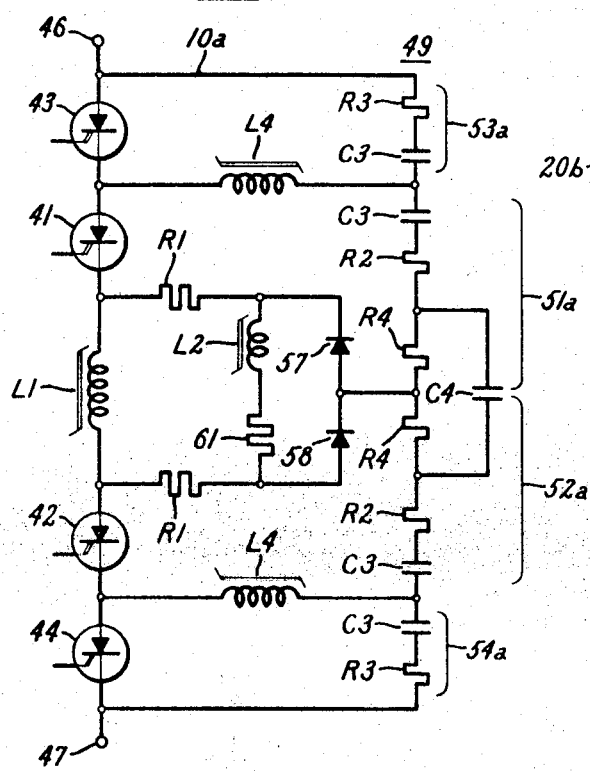
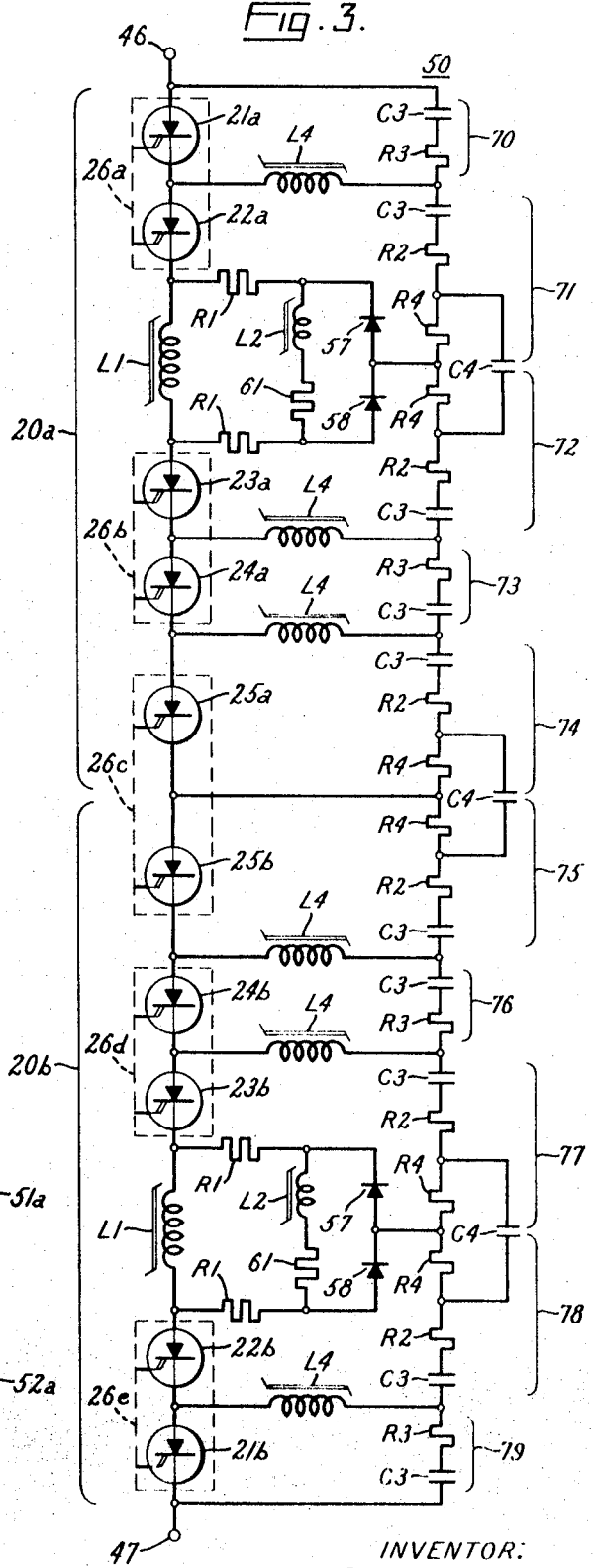

HVDC MATRIX DESIGN

BACKGROUND AND OBJECTS OF THE INVENTION

My invention relates generally to electrical switching circuits that are useful in high-voltage static power converters of the kind that can be operated alternatively in either a rectifying mode (converting AC to DC) or an inverting mode (reconverting AC to DC). Where two such converters are furnished at opposite ends of a high-voltage DC link, bulk electric power can be economically transmitted via underground or submarine cables or, for very long distances, by overhead lines, or power can be advantageously interchanged between two proximal AC systems of different or nonsynchronous frequencies.

In modern practice such converters advantageously employ solid-state electric valves comprising coordinated arrays of semiconductor switching devices which will hereinafter be referred to as SCR's (also known generally as silicon-controlled rectifiers or thyristors). Typically six such valves are arranged in a three-phase double-way bridge configuration having three separate AC terminals and a set of positive and negative DC terminals. By sequentially firing the six valves in proper order and in timed relationship with the voltage of the three-phase electric power system to which the AC terminals are connected, the flow of power between the AC and DC terminals can be controlled as desired.

Owing to the fact that individual SCR's commercially available today have current ratings that may be inadequate to meet the needs of high-power converters, several of these devices are paralleled to form a higher current "thyristor section." Further, owing to the fact that the maximum forward and reverse blocking voltage ratings of commercially available SCR's are still much lower than required for very high-voltage applications, a plurality of series thyristor sections are utilized in each valve.

As is known in the art, when connected to a source of voltage and a load, each SCR in a valve will ordinarily block appreciable current flow between its anode and cathode until triggered or "fired" by the application thereto of a control signal (gate pulse) above a small threshold value at a time when the anode voltage is positive with respect to the cathode, whereupon it abruptly switches to a conducting state. The time at which the valve is fired, measured in electrical degrees from a cyclically recurring instant at which its anode voltage first becomes positive with respect to the cathode is known as the firing angle. Forward current conduction in the valve is stopped at the end of its conducting interval each cycle by line voltage commutation.

In a converter, as the firing angle of the valves making up the bridge increase from zero (no phase retard), the average magnitude of the rectified voltage between the positive and negative DC terminals decreases from its maximum positive level. As the firing angle approaches 90°, the average DC voltage reverses polarity and the bridge commences to operate in its inverting mode, whereupon power can be transmitted from the DC to the AC terminals.

Whenever the valves in a converter are triggered at relatively late firing angles, commutation begins at a time when the relevant phase-to-phase voltage (E) of the AC system is near its crest magnitude. At this point in time there is an extra high level of energy ($\frac{1}{2} CE^2$) stored in the stray capacitance (C) of the connected system, and very severe commutation transients can be expected. Even if the quantity of stored energy were within the aggregate energy dissipating capabilities of the serially connected thyristor sections comprising the incoming valve, the situation is potentially unsafe because of the propensity of some of the individual SCR's to turn on slightly earlier than others. Thus the energy dissipation duty imposed on the slowest SCR could far exceed its rating and cause its failure. Another potential problem is that commutation transients can cause initial forward current in the SCR's to oscillate to zero and reverse, thereby quenching the valve.

In my previous U.S. Pat. No. 3,423,664, I disclosed and claimed circuitry to effectively suppress such commutation transients. It is a general object of this invention to similarly achieve that end while utilizing more economical circuitry.

Owing to the fact that individual SCR's comprising a valve may have slightly different turnoff or turn-on characteristics, the transitions between blocking and conducting states of all of the SCR's in the valve are not likely to occur simultaneously. For example, during the transition from conducting to blocking states at the end of commutation, some of the SCR's in the valve may turn off before others and therefore attempt to interrupt whatever current is then flowing. Because the full system voltage is available to drive this current, actual interruption cannot be successfully accomplished at this time. The problem has been solved by paralleling the respective SCR's with a voltage dividing RC bypass network that will accept current for a few microseconds until the remaining SCR's go into their blocking state. It can be appreciated that energy will be stored in the capacitors in these bypass networks during each period that the SCR's are blocking. Consequently, when a valve is triggered, should one of its thyristor sections turn on prior to an adjacent section, the energy stored in the bypass network shunting the first-on thyristor section will now be liberated and the associated capacitor will discharge through the first-on thyristor section. Since, as is known, a high rate of rise of current through a thyristor section may cause overheating and damage, the current flowing from the discharging capacitor must be limited. This function is performed in part by the resistance in the RC bypass network. In may aforementioned patent I provide an additional resistor to further aid in this function. That resistor also limits current being supplied from the external circuit in the event certain thyristor sections start conducting before others.

Use of this additional resistor, while performing the above two valuable functions, nevertheless may present a problem in the event that a thyristor section fails (i.e., loses its blocking capability). In that event every time reverse voltage is applied across the valve the voltage component which should normally appear across the failed thyristor section will now be impressed on the additional resistor, and hence this voltage will be added to the voltage across the part of the bypass network associated with the adjacent thyristor section, whereby the latter section is subjected to an abnormally high voltage which may cause its failure, too.

Accordingly, it is a further object of this invention to provide a circuit which, while limiting the magnitude and rate of rise of current contributed by the external circuit and/or the voltage dividing bypass network, nevertheless minimizes the chances of sequential SCR damage in the event of one SCR failure.

As is known in the art, SCR's can be triggered into conduction in certain situations in the absence of any gate signal. One type of such triggering is known as $V_{BO}$ turn on; when its anode voltage is raised above a certain critical magnitude, the SCR will break over and begin conducting. In this event a high-voltage SCR is particularly susceptible to damage by initially high rates of rise of anode current ($di/dt$). Another nongate triggering mechanism is known as $dv/dt$ turn on, wherein an SCR will begin conducting when subjected to forward anode voltage that is increasing faster than a certain critical rate. When triggered in this mode, most SCR's have a greater ability to withstand high $di/dt$ without damage.

In the event of a severe forward voltage surge, the thyristor sections making up a valve in a high-voltage converter may be rendered self-conducting by $V_{BO}$ triggering. Although the valve includes conventional current-limiting saturable core main inductors, there are some situations in which these inductors may not sufficiently limit $di/dt$ in all of the thyristor sections to preclude individual SCR damage.

Accordingly, it is a further object of this invention to provide an electric valve having means to minimize the risk of damage to any thyristor section in the event of a forward voltage surge.

Yet another object of this invention is to provide unique subcombinations of electrically related thyristor sections and inductors which can be serially interconnected to form a high-voltage solid-state valve using an expeditious mechanical arrangement of plural thyristor sections.

SUMMARY OF THE INVENTION

In carrying out my invention in one form, I connect a main saturable core inductor in series with a plurality of simultaneously triggered thyristor sections to form a solid-state switching circuit adapted to be connected to an AC electric power system. Each thyristor section comprises at least one SCR arranged to freely conduct electric current in a given direction through this circuit when triggered. Initially I shunt the main saturable core inductor with a resistance-inductance circuit whose inductance component in cooperation with the saturable core inductor will limit $di/dt$ to a value which the SCR's can safely tolerate. The total resistance in the shunting circuit has an underdamped ohmic value, and consequently it will have negligible effect on the relatively short interval required for current in this circuit to reach its peak, corresponding to a nearly complete discharge of energy stored in the associated stray capacitance of the AC system. The inductance component of the resistance-inductance circuit comprises an auxiliary saturable core inductor which begins saturating before the main inductor saturates and accordingly will, upon commencing saturation, absorb a relatively large share of the available stray capacitance energy. After the magnitude of the current flowing in the shunting circuit obtains a peak, I provide a relatively low impedance path across part of this circuit, which part includes the auxiliary inductor and a predetermined portion of said resistance. The electric energy previously stored in the auxiliary saturable core inductor will now be dissipated in said portion of said resistance. Now the main saturable core inductor is effectively shunted by only the remaining resistance which has an overdamping ohmic value, and the switching process can proceed without adverse oscillation between the main saturable core inductor and the system capacitance. Soon the main saturable core inductor saturates, and the continued rise of current in the switching circuit will be limited primarily by the inductance of the system.

Series resistance-capacitance subcircuits are placed in shunt with the respective thyristor sections of the switching circuit. These RC subcircuits insure proper division of the applied voltage when the switching circuit is not conducting. Additional inductors are connected in series with certain of said resistance-capacitance subcircuits to limit the current flowing through the first-on thyristor sections when the switching circuit is triggered.

In one aspect of my present invention, the last-mentioned inductors have saturable cores which, during periods when reverse voltage is impressed on the switching circuits, preclude the buildup of an undesirably high voltage across any thyristor section adjacent to a failed (shorted) thyristor section.

In another aspect of my invention I reduce the risk of SCR damage in the event of severe forward voltage surges by taking appropriate steps to predetermine which thyristor sections in the switching circuit are first turned on in response to such a surge and by locating the aforesaid response to such a surge and by locating the aforesaid additional inductors so that $di/dt$ in these first-on sections is safely limited. The rapid change in voltage with respect to time ($dv/dt$) across the same inductors serves to trigger the other thyristor sections (the last-on sections) in the $dv/dt$ mode. As a result of $dv/dt$ triggering, the last-on sections can safely withstand higher $di/dt$.

In yet another aspect of my invention, an odd number of series thyristor sections can be grouped with each main saturable core inductor to form a subcombination referred to hereinafter as a matrix. In order to expeditiously utilize mechanically paired thyristor sections in such an arrangement, an even number of consecutive matrices comprise (a) alternate matrices comprising, in named order, an even number of thyristor sections, a main saturable core inductor, and an odd number of thyristor sections, and (b) intermediate matrices comprising in series, in named order, an odd number of thyristor sections, a main saturable core inductor, and an even number of thyristor sections. It can be thus appreciated that with such an arrangement there is always provided an even number of thyristor sections between the main saturable core inductors, which even number of sections can be constructed of plural pairs of mechanically connected thyristor sections.

BRIEF DESCRIPTION OF THE DRAWINGS

This invention will be better understood and its various objects and advantages will be more fully appreciated from the following description taken in conjunction with the accompanying drawings in which:

FIG. 1 is a schematic diagram corresponding to FIG. 5 of my aforementioned patent;

FIG. 2 is a schematic diagram of a four-thyristor section matrix embodying features of my invention; and FIG. 3 is a schematic diagram of two serially connected five-thyristor section matrices embodying features of my invention.

DESCRIPTION OF THE PREFERRED EMBODIMENT

As discussed in my aforementioned U.S. Pat. No. 3,423,664, the disclosure of which is herein incorporated by reference, an electric valve for use in a bridge circuit of a converter may be made up of a plurality of serially connected switching matrices. One of such matrices is shown in FIG. 1, and this matrix generally corresponds to a matrix shown in FIG. 5 of that patent. It is seen to comprise thyristor sections 41 through 44 connected in series with a main saturable core inductor 45 between the main anode and cathode terminals 46 and 47 respectively.

Each of the serially interconnected thyristor sections 41 through 44 of the matrix comprises at least one high-power SCR. Such solid-state devices were discussed in the introductory portion of this specification. To insure steady state and transient voltage sharing among the respective sections of the matrix these sections are shunted by an RC bypass network 48 as shown. The SCR's in the four thyristor sections 41–44 are arranged to permit conventional current to pass through the matrix in a downward direction, as viewed in FIG. 1, when they are all triggered to forward conducting states.

Where the current rating desired for the matrix exceeds the forward current rating of a single SCR, each thyristor section can be formed by connecting two or more of these elements in parallel with one another inside a common housing, or by electrically paralleling physically separate SCR's. In such a parallel array the respective elements or devices should be selected to turn on in unison and to conduct substantially equal shares of the whole matrix current. It will therefore be apparent to those skilled in the art that the singular rectifier symbol with dual gates depicting each of the thyristor sections 41 through 44 in FIG. 1 is intended to represent an extra high current array of SCR's capable of contemporaneous switching from forward blocking states to substantially equiconducting states.

To condition the matrix for through current conduction, the SCR's in the respective thyristor sections 41 through 44 are simultaneously triggered or fired by a control circuit (not shown). Although simultaneously triggered, some of the sections may respond slightly faster than others. In this event the voltage-dividing bypass network 48 enables the turn-on process successfully to proceed until even the slowest section has attained a forward conducting state.

As shown in FIG. 1, the bypass network 48 comprises four series resistor-capacitor subcircuits 51, 52, 53 and 54 connected across the four thyristor sections 41, 42, 43 and 44 respectively. Each subcircuit comprises a resistor R3 in series with a capacitor C3. The common junction of the subcircuits 51 and 53 is connected to the common junction of the thyristor sections 41 and 43 by way of resistor R4, and the common junction of subcircuits 52 and 54 is similarly connected to the common junction of thyristor sections 42 and 44. The resistors R4 serve two purposes: 1. to limit the magnitude of current that is contributed by each RC subcircuit to the associated thyristor section when that section initially switches to its low-resistance forward conducting state, and 2. to limit similarly the current that can initially flow from the external circuit through thyristor sections 43 and 44 if both of these sections were to turn on in advance of the other two sections 41 and 42.

The common junction of subcircuits 51 and 52 forms the midpoint of the bypass network 48. This point is connected directly to the common junction of a pair of feedback diodes 55 and 56, which shunt the main inductor 45 of the matrix. The feedback diodes 55 and 56 are poled in opposition to the thyristor sections, whereby they present high impedance to forward current flowing through the matrix.

The capacitors C3 in the respective subcircuits 51 through 54 serve the desired purpose of limiting the rise of anode voltage across any thyristor section that turns on slower than others, while at the same time providing a shunt path that will bypass a limited amount of through current and thereby insure the current in the first-on section is maintained above its holding level.

The capacitors C3 in the bypass network 48 also accommodate variations in the recovery characteristics of separate thyristor sections 41 through 44. It is unlikely that all these sections will recover their reverse blocking abilities at precisely the same instant of time at the conclusion of each conducting interval of the matrix. As soon as the first-off section recovers, reverse voltage intended for the entire matrix tends to appear across that one section. However, the capacitor C3 will limit the rise of reverse voltage on the relatively fast recovery sections until slower thyristor sections of the string recover and at the same time provide a shunt path around any section that turns off earlier than others for the necessary reverse recovery current of the last-off section.

The resistors R3 in the respective subcircuits 51-54 of the bypass network serve two desired purposes. At the end of a conducting interval of the matrix, they dampen oscillations between circuit inductance and the bypass capacitors C3 and thereby limit anode voltage overshoot on the corresponding thyristor sections. In addition, at the beginning of the conducting interval they limit the initial switching current contributed to each thyristor section by the discharge of the associated bypass capacitor C3.

In an electric valve made up of a plurality of serially connected matrices it is possible that individual matrices comprising the valve will not switch simultaneously with one another. In this event the main inductor 45 that is provided in each matrix serves the important purpose of temporarily absorbing the matrix voltage and consequently preserving the desired voltage division among matrices. Preferably each of the main inductors 45 has a saturable core. During the period that the matrix is not conducting, the main inductor 45 is in an unsaturated, high-inductance state. Before the next commutation period involving this matrix can begin, its thyristor sections 41 through 44 and those of the matrices in series therewith must be turned on. Assuming that all four thyristor sections of the illustrated matrix turn on slightly earlier than those of the other matrices, the proportionate share of the incoming valve voltage originally appearing across the terminals 46 and 47 of this first-on matrix is then sustained by the unsaturated main inductor 45. Hence the matrix terminal voltage cannot collapse prematurely, and the slower matrices of the string will not be subjected to excessive anode voltage. The inductor will subsequently saturate when the time integral of voltage reaches its predetermined magnitude.

The feedback diodes 55 and 56 prevent any desirable surge of induced voltage at the terminals of the main inductor 45 when the involved matrix is concluding a conducting interval. Near the end of commutation, the magnitude of forward current in the outgoing valve will decrease to a level at which the main inductors in respective matrices of that valve unsaturate, whereupon further reduction of current tends to generate abnormally high inductor voltage. This is avoided, however, by the feedback diodes which provide a path in which inductor current can coast while the through matrix current proceeds to zero and momentarily reverses to complete the turnoff process. Any electric energy stored in the inductor 45 after the matrix turns off will be dissipated in two duplicate resistors R1 that are connected in series with the feedback diodes 55 and 56.

The feedback diodes 55 and 56 are disposed between the two R1 resistors, and a subcombination comprising an auxiliary inductor 60 in series with a resistor 61 is connected across these diodes. Thus, as can be seen in FIG. 1, the main inductor 45 of the matrix is shunted by a parallel circuit that includes the resistors R1 in series with the parallel combination of the diode rectifying means 55 and 56 and the auxiliary inductor-resistor subcombination 60, 61. The primary function of this particular set of components is to suppress commutation transients that can be expected at the beginning of a period of commutation when all matrices in the incoming valve have switched to their forward conducting states. Operation of the shunt circuit is described in detail in my aforementioned patent, and the following simplified description will be sufficient for an understanding of my present invention.

As the thyristor sections 41-44 are simultaneously triggered by the control circuit (not shown), current will begin to flow therethrough. One component of this current is contributed by the system stray capacitance. Due to the inductances of the system and of the main saturable core reactor, oscillatory commutation transients can be expected and may, as previously noted, cause individual SCR's to fail or to prematurely turn off. With the addition of the shunt circuit, current initially flows through both the main inductor 45 and the auxiliary inductor 60. A portion of the stray capacitance energy of the system will be transferred to each of these inductors. The total resistance (R1, R1 and 61) in the shunt circuit has an underdamped ohmic value and consequently has negligible effect during the short time interval required by the current flowing in this circuit to reach a peak, corresponding to nearly complete discharge of the system stray capacitance.

As the transient current flowing in the shunt circuit begins to decrease, diodes 55 and 56 will become forward biased and hence will commence conducting. Accordingly, the energy which was previously stored in inductor 60 can now be dissipated in resistor 61 which is in a series loop with inductor 60 and diodes 55 and 56. Further, the conduction of diodes 55 and 56 has the effect of shunting out a portion of the circuit shunting the main inductor 45. The portions shunted out include inductor 60 and resistor 61. Consequently, all that effectively remains in shunt with the main inductor 45 are the two R1 resistors whose total resistance has an overdamped ohmic value, and the switching process can now proceed without oscillation.

In one aspect of my present invention, the auxiliary inductor 60, shown in the matrix of FIG. 1, has been replaced by a saturable core inductor L2, as shown in FIG. 2. As previously described the auxiliary inductor absorbs stray capacitance energy during the period before conduction begins in the diodes which are connected in parallel therewith. Preferably, when unsaturated, inductors L1 and L2 have equal inductances, and therefore substantially the same amount of energy will be transferred to each of them prior to saturation. The auxiliary inductor L2 is constructed with a saturable core designed to start saturating well before the main inductor L1 and before the diodes 57, 58 begin conducting. As soon as inductor L2 begins saturating it will accept a progressively larger fraction of the total through current. Since the energy in an inductor is directly proportional to its inductance times the square of its current, once the inductor L2 begins saturation it will accept an increasingly greater share of the available stray capacitance energy compared to the unsaturated inductor L1. As a result, a greater portion of the stray capacitance energy of the system is absorbed by the auxiliary saturable core inductor L2 than was true of the auxiliary linear inductor 60. With such a modification of the shunt circuit, the main inductor L1 needn't absorb as great a portion of the available stray capacitance energy as the corresponding main inductor 45 of FIG. 1, and it can be made smaller than 45.

By reducing the size of the main inductor, economic savings are provided with no sacrifice in transient suppression. Further, since hysteresis and eddy current losses in a saturable core are a function of core size, a reduction in its size also reduced power losses and thereby entails an increase in circuit efficiency.

As is shown in FIG. 2 a voltage dividing RC bypass network 49 is provided in matrix 10a. Bypass network 49 comprises a series of subcircuits 53a, 51a, 52a, and 54a respectively shunting thyristor sections 43, 41, 42, and 44. Each of these subcircuits comprises a resistor in series with a capacitor (the capacitor being adjacent to a first end of the subcircuit and the resistor being adjacent to the other or second end of the subcircuit). Bypass network 49 serves the same function as bypass network 48 (previously described with reference to FIG. 1). It should be noted that whereas each of the RC subcircuits shown in FIG. 1 comprises a resistor R3 and a capacitor C3, each of the adjoining subcircuits 51a and 52a shown in FIG. 2 comprises two resistors R2 and R4 and a capacitor C3. Neglecting the effect of C4 to be discussed later, all of the RC subcircuits 51a through 54a in the network 49 have the same electrical properties since the total resistance of resistor R2 and resistor R4 is made to equal the resistance of R3.

As shown in FIG. 2, a saturable core inductor L4 is connected between the junction of subcircuit 52a and 54a and the common point of thyristor sections 42 and 44. A similar saturable core inductor L4 is connected between the junction of subcircuits 53a and 51a and the common point of adjoining thyristor sections 41 and 43. These two inductance elements L4 serve to perform the previously mentioned current limiting functions that the resistors R4 of FIG. 1 perform and in addition to provide a protective feature for the matrix. In the matrix of FIG. 1 there is a possibility that if one of the thyristor sections, for example, section 42 were to fail, then during the cyclically recurring periods that reverse voltage is impressed across this matrix the portion of reverse voltage normally blocked by section 42 would now substantially appear across its associated resistor R4 (the small voltage drop across R1 being negligible). Since this resistor R4 is also in series with subcircuit 54, the voltage appearing across R4 would add to the voltage across subcircuit 54 and subject thyristor section 44 to a reverse voltage approaching twice the the level that should normally exist if the thyristor section 42 had not failed. This can overstress the sound section 44 and may appreciably shorten its useful life.

In order to minimize the increase of reverse voltage across a thyristor section adjoining any thyristor section that fails, I use saturable core inductors L4 in lieu of resistors R4, and such are shown in FIG. 2. In order to appreciate this aspect of my invention, assume that the thyristor section 42 in the matrix 10a is shorted. During each period of reverse voltage on this matrix, the voltage across the inductor L4 associated with the failed section 42 will initially increase with increasing voltage across the matrix. However, the core of inductor L4 soon saturates, and thereafter this inductor, for all practical purposes, can be considered a short. As a result the voltage impressed on the adjoining thyristor section 44 will be close to a normal share of reverse voltage although somewhat higher. The magnitude of the peak reverse voltage increment is a function of the number of RC subcircuits and the number of shorted thyristor sections. For example, if a single thyristor section were to fail in a valve comprising five matrices 10a in series, the voltage increment on each of the remaining 19 thyristor sections will be only 5.26 percent compared to approximately 100 percent on the adjoining sound section in FIG. 1.

As has been previously noted, should an SCR be subjected to forward voltage whose magnitude exceeds its forward breakover voltage $V_{BO}$, the SCR will be rendered conductive. In such an event, in order to prevent internal damage to the SCR, the rate of rise of current flowing therethrough should be carefully limited. Under certain conditions the main inductor 45 and the auxiliary inductor 60 of the matrix shown in FIG. 1 may not limit current enough to prevent individual SCR damage when the thyristor sections are triggered in the $V_{BO}$ mode.

In another aspect of my invention, I protect the SCR's from damage when the matrix is subjected to a steep-front surge of abnormally high forward voltage by controlling the order in which the respective thyristor sections are turned on and by utilizing the previously described inductors L4 not only to limit current in the first-on sections but also to effect $dv/dt$ firing of the last-on sections. More specifically, considering the pair of thyristor sections 41 and 43 by way of example, the section 43 is caused to turn on before the section 41 in the event excessive forward voltage is impressed on the matrix 10a, whereby the inductor L4, which is located in the circuit connecting a point between these adjoining sections to the common junction of the respectively associated subcircuits 53a and 51a, will safely limit $di/dt$ in section 43 and will effect turn-on of section 41 in its $dv/dt$ mode. This result can be obtained either by making section 43 more sensitive than section 41 to voltage surges (e.g., by using SCR's in section 43 that have lower $V_{BO}$ characteristics than the SCR's in section 41), or by imposing a disproportionately large share of the surge voltage on section 43. In the illustrated embodiment of my invention, each of the thyristor sections has substantially the same $V_{BO}$ level, and the capacitor C4 is used to force $V_{BO}$ firing of sections 43 and 44 ahead of sections 41 and 42 if and when the contemplated surge occurs.

As is shown in FIG. 2, capacitor C4 is connected between the common point of resistors R2 and R4 in subcircuit circuit 51a and the common point of resistors R2 and R4 in subcircuit 52a, thereby transiently shunting the resistors R4 in each of these adjoining subcircuits of the bypass network 49. The desired effect of capacitor C4 is to short circuit a portion (R4) of the total resistance of each of the subcircuits 51a and 52a in the event of a steep front forward voltage surge. In order to do this, the time constant of the two R4–C4 parallel combination should be of the order of 0.1 or less of the time constant of the R3–C3 subcircuit. In one embodiment of my invention the R4–C4 parallel combination is chosen to have a time constant of 5 microseconds or less whereas the time constant of the R3–C3 subcircuit is chosen to have a time constant of approximately 50 microseconds. Further, the resistance of R4 is chosen to be approximately 20 percent of R3. Therefore, a steep front forward surge voltage will not be equally divided by the subcircuits; instead subcircuits 53a and 54a will each have a 25 percent greater portion of the surge voltage impressed across themselves than will subcircuits 51a and 52a. As soon as the surge voltage impressed on the entire matrix reaches a predetermined level at which the portion thereof across subcircuits 53a and 54a equals the $V_{BO}$ rating of the companion thyristor sections 43 and 44, these two sections will commence conducting in the $V_{BO}$ mode. The inductor L4 associated with each of these first-on sections is designed to safely limit $di/dt$ therein. At the same time, as the voltage across each of the thyristor sections 43 and 44 collapses rapidly due to the $V_{BO}$ conduction, the voltage across the associated inductor L4 changes abruptly and adds to the surge voltage in a manner that produces a very high rate of rise of forward voltage across the respectively adjoining thyristor sections 41 and 42, thereby effecting $dv/dt$ turn-on of these latter sections. As has been previously mentioned, most SCR's can safely tolerate more $di/dt$ when triggered in the $dv/dt$ mode as compared with the $V_{BO}$ mode. Accordingly, even if the main and auxiliary inductors L1 and L2 were inadequate by themselves to safely limit current in the last-on sections 41 and 42 in certain situations of $V_{BO}$ triggering, the $dv/dt$ effect ensures successful turn-on in any event.

It is to be understood that in lieu of using one capacitor C4 to shunt both resistors R4 two capacitors may be used. In that case each capacitor would individually be placed in shunt with each R4 resistor. Also, although two resistors, namely R2 and R4, are shown in each of the RC subcircuits 51a and 52a, it should be apparent that a single resistor having an ohmic value equal to R3 could be utilized if that resistor has an intermediate tap.

In the interest of economy, the SCR's of adjoining thyristor sections sometimes share a common mechanical assembly. See for example, FIGS. 4 and 10d of U.S. Pat. No. 3,471,757—Sias. Should each matrix in a valve have an even number of thyristor sections on each side of its main saturable core inductor, use can be made of such mechanically paired thyristor sections. Accordingly, when the matrix 10a in FIG. 2 is connected in series with at least one other duplicate matrix to form an electric valve, a pair of mechanically joined thyristor sections can be used for the schematically shown thyristor sections 43 and 41 of the first matrix, a second pair of mechanically connected thyristor sections can be used for the schematically shown thyristor sections 42 and 44 of the first matrix, a third pair of mechanically connected thyristor sections can be used for the thyristor sections 43 and 41 of the second matrix, and a fourth pair of mechanically connected thyristor sections can be used for the thyristor sections 42 and 44 of the second matrix. Consequently it can be appreciated that use of duplicate matrices 10a in series with one another allows the expeditious use of mechanically paired thyristor sections with a repetitive pattern of four sections between successive main inductors.

Where, however, matrices having odd numbers of thyristor sections are desired, the use of mechanically paired thyristor sections presents a problem. The solution to just such a problem forms another aspect of my invention.

In FIG. 3 a combination of two serially connected odd-thyristor section matrices 20a and 20b is shown. One or more of these combinations can be serially interconnected to form a high-voltage solid-state valve. Matrix 20a, hereinafter referred to as an alternate matrix, is seen to comprise five serially related thyristor sections 21a through 25a and one main saturable core inductor L1. Matrix 20b, hereinafter referred to as an intermediate matrix is also seen to comprise five serially related thyristor sections 21b through 25b and one main saturable core inductor L1. Each matrix additionally includes: main inductor L1 shunting circuitry whose operation is similar to the corresponding circuitry of FIG. 2; a bypass network 50 comprising a plurality of voltage dividing RC subcircuits (70 through 74 for matrix 20a and 75 through 79 for matrix 20b) whose operation is similar to the RC subcircuits 51a through 54a of FIG. 2; saturable core inductors L4 whose operation is similar to that of the inductors L4 in FIG. 2; and an additional shunt capacitor C4 which is provided for the same reason as capacitor C4, FIG. 2. Because of the above similarities between this circuit and the circuit shown in FIG. 2, the previous description of their common features will apply in general to FIG. 3. The principal new feature of the FIG. 3 embodiment of my invention involves the number and disposition of the thyristor sections which will now be more fully explained.

The serially connected alternate and intermediate matrices (20a and 20b respectively) shown in FIG. 3 are so constructed and arranged that a valve using such combinations will have an even number of thyristor sections (e.g., alternately six and four) between successive main inductors L1 and will also have an even number of sections (e.g. two) at each end. More specifically, a pair of thyristor sections 21a and 22a is situated on one side of main inductor L1 of the alternate matrix 20a, and a pair of thyristor sections 21b and 22b is situated on the opposite side of the main inductor L1 of the intermediate matrix 20b. Six thyristor sections 23a, 24a, 25a, 25b, 24b, and 23b are situated between the two main inductors, the first three being electrically associated with matrix 20a and the other three with matrix 20b. With such an arrangement it is possible to mechanically assemble the schematically shown adjoining thyristor sections in duplicate sets of two sections each. In that regard, thyristor sections 21a and 22a are mechanically joined to form pair 26a. Similarly, sections 23a and 24a in matrix 20a form pair 26b, sections 24b and 23b in matrix 20b form pair 26d, and sections 22b and 21b form pair 26e. Although the thyristor sections 25a and 25b are in different matrices, they are mechanically joined together in a unitary assembly 26c.

It should be apparent to those skilled in the art that the concept embodied in FIG. 3 solves the problem of constructing a valve with matrices having any odd number of thyristor sections per main inductor while maintaining even numbers of thyristor sections on both sides of all the main inductors. Complete mechanical pairing of thyristor sections is accomplished by using an even number (N) of consecutive matrices alternate ones of which each comprises, in named order, an even number of thyristor sections, a main saturable core inductor, and an odd number of thyristor sections, and each of the intermediate matrices comprises, in named order, an odd number of thyristor sections, a main saturable core inductor, and an even number of thyristor sections. While the alternate and intermediate matrices as above described and as shown in FIG. 3 can be considered as mirror images of each other (except for thyristor and diode direction), this needn't be the case. The odd number of thyristor sections comprising the alternate matrices could be different than the odd number of thyristor sections comprising the intermediate matrices and still the end result of always having even numbers of thyristor sections between main inductors (such that these sections can be mechanically paired) is achieved.

While particular embodiments of my invention have been shown and described, it will be obvious to those skilled in the art that various changes and modifications may be made without departing from my invention in its broader aspects. For example, I contemplate using auxiliary saturable core inductors L2 in matrices having only two thyristor sections (41 and 42) each. I therefore intend to cover all such changes and modifications as fall within the true scope and spirit of my invention.

What I claim as new and desire to secure by Letters Patent of the United States is:

1. In combination with a solid-state switching circuit that includes a first saturable core inductor in series with a series of thyristor sections each of which has at least one semiconductor controlled rectifier arranged to conduct electric current in a given direction through said circuit when triggered, said switching circuit being adapted to be connected to an AC electric power system and the controlled rectifiers of all of said sections being adapted to be cyclically triggered by associated control means, the improvement comprising:

a. means for effectively shunting said first saturable core inductor with a resistance-inductance circuit having a predetermined total resistance and having a second saturable core inductor so constructed that after said controlled rectifiers are triggered it begins to saturate before said first saturable core inductor begins to saturate; and b. means operative after the magnitude of current flowing through said shunting means attains a peak for providing a relatively low impedance path across part of said resistance-inductance circuit, said part including said second inductor and a predetermined portion of said total resistance, whereupon i. electric energy stored in said second inductor is dissipated in said portion of said resistance, and ii. said first saturable core reactor is effectively shunted by only the remaining resistance.

2. The improvement as specified in claim 1 wherein the AC system has stray capacitance and total resistance of said resistance-inductance circuit has an underdamping ohmic value and wherein said remaining resistance has an overdamping ohmic value.

3. The improvement as specified in claim 2 wherein said second saturable core inductor begins to saturate before the magnitude of the current flowing through said shunting means attains a peak.

4. An improved electric current-switching circuit including, in series, a main saturable core inductor and at least one thyristor section comprising a controlled rectifier that will permit current to pass through said circuit in a given direction when triggered from a relatively high resistance nonconducting state to a low-resistance conducting state, wherein the improvement comprises shunting the main inductor with a parallel circuit including:
 a. a subcombination comprising a first resistor and an auxiliary saturable core inductor connected in series with each other, said auxiliary saturable core inductor being so constructed that it begins to saturate before said main saturable core inductor begins to saturate;
 b. switch means connected in parallel with said subcombination;
 c. at least one other resistor;
 d. means for connecting across said main inductor, said other resistor in series with the parallel combination of said switch means and said subcombination;
 e. said switch means being rendered conductive in response to a decrease in current flowing through said subcombination.

5. A switching circuit as specified in claim 4 wherein said switching means comprises rectifying means poled in opposition to said controlled rectifier and wherein said auxiliary inductor begins to saturate before said rectifying means is rendered conductive.

6. A commutation transient suppressing circuit connected in shunt across a main saturable core inductor which inductor is in series with a series of cyclically conducting thyristor sections in a power circuit having a predetermined stray capacitance comprising:
 a. a resistance in series with an auxiliary saturable core inductor, said auxiliary inductor being so constructed as to begin saturation before said main saturable core inductor begins to saturate;
 b. switch means in shunt across said auxiliary inductor and a portion of said resistance, said switch means being rendered conductive in response to a decrease in current flowing through said resistance and said auxiliary inductor whereupon
  i. electric energy stored in said auxiliary inductor is dissipated in said portion of said resistance, and
  ii. said main inductor is effectively shunted by only the remaining resistance.

7. A commutation transient suppressing circuit as specified in claim 6 wherein the first-mentioned resistance has an underdamping ohmic value and wherein said remaining resistance has an overdamping ohmic value.

8. A commutation transient suppressing circuit as specified in claim 7 wherein said auxiliary inductor begins to saturate prior to said switch means being rendered conductive.

9. An electric current-switching circuit comprising:
 a. first and second thyristor sections each having an anode and a cathode;
 b. first means for connecting the cathode of said first thyristor section to the anode of said second thyristor section;
 c. first and second voltage-dividing bypass subcircuits respectively comprising a capacitance element in series with a resistance element, each of said subcircuits having first and second ends;
 d. a first saturable core inductor connected between the first end of said first subcircuit and the anode of said first thyristor section;
 e. a second saturable core inductor connected between the first end of said second subcircuit and the cathode of said second thyristor section; and
 f. second means for connecting the second ends of said first and second subcircuits to each other and to said first means.

10. The electric current-switching circuit as specified in claim 9 wherein said circuit additionally comprises:
 g. third thyristor and fourth thyristor sections each having an anode and a cathode;
 h. third means for connecting the cathode of said third thyristor section to the anode of said first thyristor section;
 i. fourth means for connecting the anode of said fourth thyristor section to the cathode of said second thyristor section;
 j. a third voltage-dividing bypass subcircuit comprising a capacitance element in series with a resistance element, said third subcircuit being connected between the anode of said third thyristor section and the first end of said first subcircuit;
 k. a fourth voltage-dividing bypass subcircuit comprising a capacitance element in series with a resistance element, said fourth subcircuit being connected between the cathode of said fourth thyristor section and the first end of said second subcircuit, 11. The electric current-switching circuit as specified in claim 10 wherein additional capacitance means is connected across a predetermined portion of the resistance in said first subcircuit and a corresponding portion of the resistance in said second subcircuit.

12. An electric current-switching circuit comprising:
 a. first and second thyristor sections each comprising at least one controlled rectifier having an anode and a cathode between which electric current is conducted when the rectifier is triggered;
 b. a main saturable core inductor connected between the cathode of said first thyristor section and the anode of said second thyristor section;
 c. first and second voltage-dividing bypass subcircuits respectively comprising a capacitance element in series with a resistance element, each of said subcircuits having first and second ends;
 d. a first inductance element connected between the first end of said first subcircuit and the anode of said first thyristor section;
 e. a second inductance element connected between the first end of said second subcircuit and the cathode of said second thyristor section;
 f. means for effectively shunting said main saturable core inductor with a resistance-inductance circuit comprising an auxiliary inductor and a predetermined total resistance;
 g. means operative after the magnitude of current flowing through said resistance-inductance circuit attains a peak for providing a relatively low impedance path across part of said resistance-inductance circuit, said part including said auxiliary inductor and a predetermined portion of the resistance of said circuit; and
 h. means for connecting said last mentioned means to the second ends of both of said subcircuits.

13. An electric current-switching circuit as specified in claim 12 wherein said auxiliary inductor has a saturable core and is so constructed as to begin saturating before said main saturable core inductor begins to saturate.

14. The electric current-switching circuit as specified in claim 12 wherein additional capacitance means is connected across a predetermined portion of the resistance in said first subcircuit and a corresponding portion of the resistance in said second subcircuit.

15. An electric current-switching circuit as specified in claim 14 wherein said auxiliary inductor has a saturable core and is so constructed as to begin saturating before said main saturable core inductor begins to saturate.

16. An electric current-switching circuit comprising:
 a. a pair of adjoining thyristor sections connected at a first point;

b. a pair of voltage-dividing resistance-capacitance subcircuits connected across said thyristor sections, respectively;
c. a current-limiting inductance element connected between said first point and the common junction of said subcircuits; and
d. means responsive to the detection of a forward steep front surge of abnormally high forward voltage on said switching circuit for causing a predetermined one of said thyristor sections to turn on before the other, whereby said inductance element can safely limit current in the first-on section and at the same time effect $dv/dt$ turn on of said other section.

17. An electric current-switching circuit as specified in claim 16 wherein said last-mentioned means comprises additional capacitance means connected across a predetermined portion of the resistance in the subcircuit that is associated with said other thyristor section.

18. The electric current-switching circuit as specified in claim 16 wherein commutation transient suppression means is connected in series with said thyristor sections.

19. In combination with a solid-state switching circuit including at least two pairs of serially related thyristor sections each of which is shunted by a series resistance-capacitance voltage dividing bypass subcircuit the improvement which comprises additional capacitance means shunting a portion of the resistance in a predetermined one of said bypass sub circuits and a corresponding portion of the resistance in an adjoining one of said bypass subcircuits.

20. The improvement as specified in claim 19 wherein said additional capacitance means does not shunt any portion of the capacitance of either bypass subcircuit.

* * * * *